United States Patent
Hwang et al.

(10) Patent No.: US 10,285,101 B2
(45) Date of Patent: May 7, 2019

(54) METHOD AND APPARATUS FOR ADJUSTING DATA TRANSMISSION RATE BETWEEN VEHICLE AND ACCESS POINT

(71) Applicant: DONGGUK UNIVERSITY INDUSTRY-ACADEMIC COOPERATION FOUNDATION, Seoul (KR)

(72) Inventors: Seung Hoon Hwang, Seoul (KR); Seong Hyung Lee, Seongnam-si (KR); Seong Hee Lee, Suwon-si (KR)

(73) Assignee: DONGGUK UNIVERSITY INDUSTRY-ACADEMIC COOPERATION FOUNDATION, Seoul (KR)

(*) Notice: Subject to any disclaimer, the term of this patent is extended or adjusted under 35 U.S.C. 154(b) by 88 days.

(21) Appl. No.: 15/549,323

(22) PCT Filed: Feb. 4, 2016

(86) PCT No.: PCT/KR2016/001217
§ 371 (c)(1),
(2) Date: Aug. 7, 2017

(87) PCT Pub. No.: WO2016/126117
PCT Pub. Date: Aug. 11, 2016

(65) Prior Publication Data
US 2018/0027467 A1  Jan. 25, 2018

(30) Foreign Application Priority Data
Feb. 6, 2015 (KR) .................. 10-2015-0018893

(51) Int. Cl.
*H04W 36/18* (2009.01)
*H04W 28/02* (2009.01)
(Continued)

(52) U.S. Cl.
CPC .......... *H04W 36/18* (2013.01); *H04L 1/0003* (2013.01); *H04L 47/25* (2013.01);
(Continued)

(58) Field of Classification Search
CPC .. H04L 1/0003; H04L 47/25; H04W 28/0215; H04W 28/0226; H04W 28/0236;
(Continued)

(56) References Cited

U.S. PATENT DOCUMENTS

| 7,697,450 B2* | 4/2010 | D'Amico | H04B 7/155 370/252 |
| 8,040,277 B2* | 10/2011 | Dicke | G01S 19/34 342/357.52 |

(Continued)

FOREIGN PATENT DOCUMENTS

| KR | 10-2010-0083040 A | 7/2010 |
| KR | 10-2011-0071793 A | 6/2011 |

(Continued)

OTHER PUBLICATIONS

International Search Report, PCT/KR2016/001217, dated May 19, 2016.

*Primary Examiner* — Chi H Pham
*Assistant Examiner* — Weibin Huang
(74) *Attorney, Agent, or Firm* — Lucas & Mercanti, LLP (57) ABSTRACT

Disclosed is a method of adjusting a data transmission rate between a vehicle and an access point (AP) as an embodiment of the present invention. The method according to an embodiment of the present invention may include receiving a signal broadcast from at least one AP near a vehicle, transmitting and/or receiving data to and/or from a predetermined AP at a first data transmission rate $R_0$ on the basis of the received signal, receiving and storing signals broadcast from a plurality of APs near the vehicle in every (Continued)

predetermined period while the vehicle is moving, determining the number $N_T$ of APs having broadcast signals with strength greater than or equal to a threshold value among the signals received from the plurality of APs, comparing the number $N_T$ of APs to the number $N_{T-1}$ of APs having broadcast signals with strength greater than or equal to the threshold value in a previous period, and determining a data transmission rate between the vehicle and the AP on the basis of a result of the comparison.

20 Claims, 5 Drawing Sheets (51) Int. Cl.
    *H04W 36/30* (2009.01)
    *H04W 72/00* (2009.01)
    *H04W 72/08* (2009.01)
    *H04L 1/00* (2006.01)
    *H04W 40/24* (2009.01)
    *H04L 12/825* (2013.01)
    *H04L 29/08* (2006.01)
    *H04W 36/32* (2009.01)

(52) U.S. Cl.
    CPC ... *H04W 28/0215* (2013.01); *H04W 28/0226* (2013.01); *H04W 28/0236* (2013.01); *H04W 36/30* (2013.01); *H04W 40/244* (2013.01); *H04W 72/005* (2013.01); *H04W 72/085* (2013.01); *H04L 67/12* (2013.01); *H04L 2001/0093* (2013.01); *H04W 36/32* (2013.01)

(58) Field of Classification Search
    CPC ... H04W 36/18; H04W 36/30; H04W 40/244; H04W 72/005; H04W 72/085
    See application file for complete search history.

(56) References Cited

U.S. PATENT DOCUMENTS

| | | | | |
|---|---|---|---|---|
| 9,467,883 | B2* | 10/2016 | Shin | H04W 4/80 |
| 9,480,025 | B2* | 10/2016 | Zur | H04W 52/24 |
| 9,510,194 | B2* | 11/2016 | Elliott | H04W 12/06 |
| 10,045,278 | B2* | 8/2018 | Cho | H04W 48/16 |
| 2004/0121749 | A1* | 6/2004 | Cui | H04W 72/085 |
| | | | | 455/226.1 |
| 2008/0273497 | A1* | 11/2008 | Lu | H04H 20/26 |
| | | | | 370/331 |
| 2010/0177639 | A1* | 7/2010 | Nam | H04W 72/082 |
| | | | | 370/237 |
| 2013/0258950 | A1* | 10/2013 | Behroozi | H04W 52/242 |
| | | | | 370/328 |
| 2015/0124681 | A1* | 5/2015 | Zhou | H04M 3/567 |
| | | | | 370/312 |
| 2015/0189556 | A1* | 7/2015 | Sidhu | H04W 36/14 |
| | | | | 455/436 |
| 2016/0269964 | A1* | 9/2016 | Murray | H04W 36/08 |
| 2016/0277973 | A1* | 9/2016 | Luo | H04W 28/26 |

FOREIGN PATENT DOCUMENTS

| | | |
|---|---|---|
| KR | 10-2011-0100330 A | 9/2011 |
| KR | 10-2013-0055501 A | 5/2013 |
| KR | 10-2014-0015823 A | 2/2014 |

* cited by examiner

FIG. 5

METHOD AND APPARATUS FOR ADJUSTING DATA TRANSMISSION RATE BETWEEN VEHICLE AND ACCESS POINT

CROSS-REFERENCE TO RELATED APPLICATIONS

This application is a 371 of PCT/KR2016/001272, filed on Feb. 4, 2016, which claims the benefit of Korean Patent Application No. 10-2015-0018893 filed Feb. 6, 2015, the contents of each of which are incorporated herein by reference.

TECHNICAL FIELD

The present invention relates to a method and apparatus for adjusting a data transmission rate between a vehicle and an access point (AP), and more particularly, to a method and apparatus for adjusting a data transmission rate between a vehicle and an AP according to the number of APs near the vehicle.

BACKGROUND ART

A vehicle communication technique may be classified into Vehicle-to-Vehicle (V2V) communication between vehicles and Vehicle-to-Infrastructure (V2I) communication between a vehicle and a base station. V2V may be used for the purpose of convenience or safety of drivers who are driving since vehicles form their own network without the help of communication infrastructure while V2I may be used to provide a multimedia service such as a map or the Internet to drivers. Also, V2I technique may be used by a vehicle to transmit vehicle information to a server connected to a base station through the base station as well as to receive information from the base station.

Figure 1:
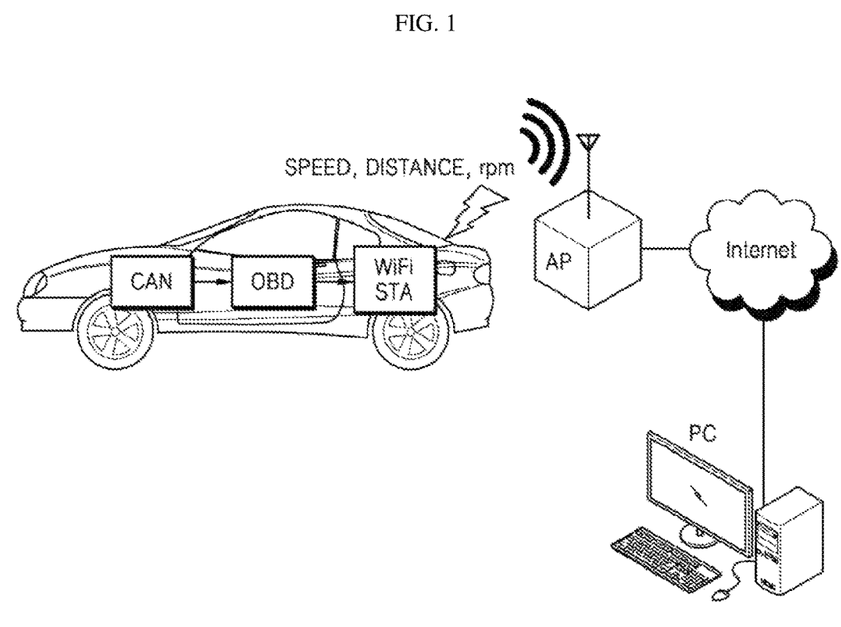
FIG. 1 is a schematic diagram showing a process in which vehicle information acquired from an OBD of a vehicle is provided to a server through an AP and managed by the server.

FIG. 1 is a schematic diagram showing a process in which vehicle information acquired from an on-board diagnostics (OBD) system of a vehicle is provided to a server through an AP and managed by the server. FIG. 1 actually disclosed a process in which vehicle information may be acquired from an OBD system and transmitted to an external AP through a Wi-Fi module or the like and a server may check and manage the transmitted vehicle information. Generally, connection and communication between a Wi-Fi module and an AP may be performed in the following process. APs periodically broadcast beacon signals containing information regarding various types of parameter sets such as an SSID, which is a unique identifier, a current state, and a supported transmission rate, and a communication module such as a Wi-Fi module receives the beacon signals broadcast by the APs and connects to one connectable AP among the APs. When the communication module goes beyond the coverage of the current AP, the communication module may connect to a new AP through a handoff or lose communication connection when there is no AP near the communication module.

The greatest problem with communication between a vehicle and a base station is that a handoff from an AP frequently occurs because the vehicle moves at high speed, and the frequent handoffs may cause a failure in seamless communication connection and also reduce communication reliability. Accordingly, in order to solve the above-described problems with V2I communication, much research has been conducted on an algorithm for selecting an appropriate AP, and many techniques for securing a handoff have been developed. However, conventional techniques that have already been developed still have limitations in securing seamless connection and reliability of communication between a vehicle and a base station.

DETAILED DESCRIPTION OF THE INVENTION

Technical Problem

The present invention is intended to prevent communication seamlessness from being reduced due to a frequent handoff and enhance communication reliability.

Technical Solution

A method of adjusting a data transmission rate between a vehicle and an access point (AP) according to an embodiment of the present invention may include receiving a signal broadcast from at least one AP near the vehicle, transmitting and/or receiving data to and/or from a predetermined AP at a first data transmission rate $R_0$ on the basis of the received signal, receiving and storing signals broadcast from a plurality of APs near the vehicle in every predetermined period while the vehicle is moving, determining the number $N_T$ of APs having broadcast signals with strength greater than or equal to a threshold value among the signals received from the plurality of APs, comparing the number $N_T$ of APs to the number $N_{T-1}$ of APs having broadcast signals with strength greater than or equal to the threshold value in a previous period, and determining a data transmission rate between the vehicle and the AP on the basis of a result of the comparison.

Also, the signal broadcast from the AP may include a parameter indicating at least one of unique identification information (SSID), a cell ID, a state, transmission power, and a supported transmission rate of the AP.

Also, the predetermined AP according to an embodiment of the present invention may be an AP having broadcast a signal with the greatest strength.

Also, the determining of a data transmission rate between the vehicle and the AP on the basis of a result of the comparison according to an embodiment of the present invention may include maintaining the data transmission rate between the vehicle and the AP at a current data transmission rate $R_{T-1}$ when the number $N_T$ of APs having broadcast signals with strength greater than or equal to the threshold value in a current period is equal to the number $N_{T-1}$ of APs having broadcast signals with strength greater than or equal to the threshold value in the previous period, decreasing the data transmission rate between the vehicle and the AP below $R_{T-1}$ when $N_{T-1}$ is less than $N_T$, and increasing the data transmission rate between the vehicle and the AP above $R_{T-1}$ when $N_{T-1}$ is greater than $N_T$.

The method according to an embodiment of the present invention may further include changing a modulation scheme in order to adjust the data transmission rate between the vehicle and the AP to the determined data transmission rate, and the change of the modulation scheme may include changing a modulation level from a high level to a low level in order to decrease the data transmission rate or changing a modulation level from a low level to a high level in order to increase the data transmission rate.

Also, in a communication environment using a fixed modulation scheme, the data transmission rate itself between the vehicle and the AP may be adjusted without the change of the modulation scheme. The adjustment of the data transmission rate itself between the vehicle and the AP may be to decrease or increase the data transmission rate.

Also, the data transmission rate between the vehicle and the AP may be adjustable by a transmission period of data in a buffer being changed, and the data transmission rate may be decreased by the transmission period of the data in the buffer being extended or may be increased by the transmission period of the data in the buffer being shortened.

Also, the method according to an embodiment of the present invention may further include adjusting the data transmission rate to increase by the first data transmission rate $R_0$ when the data transmission rate decreases to a minimum threshold value $R_{min}$.

Also, the method may further include maintaining the data transmission rate at a maximum threshold value $R_{max}$ when the data transmission rate increases to the maximum threshold value $R_{max}$.

An apparatus for adjusting a data transmission rate between a vehicle and an access point (AP) according to an embodiment of the present invention may include a communication unit configured to receive a signal broadcast from at least one AP near the vehicle and transmit and/or receive data to and/or from a predetermined AP at a first data transmission rate $R_0$ on the basis of the received signal, a storage unit configured to receive signals broadcast from a plurality of APs near the vehicle through the communication unit in every predetermined period while the vehicle is moving and to store the received signals, an analysis unit configured to determine the number $N_T$ of APs having broadcast signals with strength greater than or equal to a threshold value among the signals received from the plurality of APs and to compare the number $N_T$ of APs to the number $N_{T-1}$ of APs having broadcast signals with strength greater than or equal to the threshold value in a previous period, and a control unit configured to determine a data transmission rate between the vehicle and the AP on the basis of a result of the comparison.

Also, the signal broadcast from the AP may be a signal including a parameter indicating at least one of unique identification information (SSID), a cell ID, a state, transmission power, and a supported transmission rate of the AP.

Also, the predetermined AP according to an embodiment of the present invention may be an AP having broadcast a signal with the greatest strength.

The control unit according to an embodiment of the present invention may maintain the data transmission rate between the vehicle and the AP at a current data transmission rate $R_{T-1}$ when the number $N_T$ of APs having broadcast signals with strength greater than or equal to the threshold value in a current period is equal to the number $N_{T-1}$ of APs having broadcast signals with strength greater than or equal to the threshold value in the previous period, decrease the data transmission rate between the vehicle and the AP below $R_{T-1}$ when $N_{T-1}$ is less than $N_T$, and increase the data transmission rate between the vehicle and the AP above $R_{T-1}$ when $N_{T-1}$ is greater than $N_T$.

The apparatus according to an embodiment of the present invention may further include a changing unit configured to change a modulation scheme in order to adjust the data transmission rate between the vehicle and the AP to the determined data transmission rate. The change of the modulation scheme may include changing a modulation level from a high level to a low level in order to decrease the data transmission rate or changing a modulation level from a low level to a high level in order to increase the data transmission rate.

Also, in a communication environment using a fixed modulation scheme, the data transmission rate itself between the vehicle and the AP may be adjusted by the control unit without the change of the modulation scheme. The adjustment of the data transmission rate itself between the vehicle and the AP may be to decrease or increase the data transmission rate.

Also, the data transmission rate between the vehicle and the AP may be adjustable by a transmission period of data in a buffer connected with the communication unit being changed, and the data transmission rate may be decreased by the transmission period of the data in the buffer being extended or may be increased by the transmission period of the data in the buffer being shortened.

Also, the control unit may adjust the data transmission rate to increase by the first data transmission rate $R_0$ when the data transmission rate decreases to a minimum threshold value $R_{min}$.

Also, the control unit may maintain the data transmission rate at a maximum threshold value $R_{max}$ when the data transmission rate increases to the maximum threshold value $R_{max}$.

According to an embodiment of the present invention, there may be provided a computer-readable recording medium on which a computer program for executing the above-methods is recorded.

Advantageous Effects of the Invention

According to the present invention, it is possible to enable seamless and reliable V2I communication by adjusting a data transmission rate in communication between a vehicle and an AP according to the number of available APs near the vehicle.

BEST MODE

A method of adjusting a data transmission rate between a vehicle and an access point (AP) according to an embodiment of the present invention may include receiving a signal broadcast from at least one AP near the vehicle, transmitting and/or receiving data to and/or from a predetermined AP at a first data transmission rate $R_0$ on the basis of the received signal, receiving and storing signals broadcast from a plurality of APs near the vehicle in every predetermined period while the vehicle is moving, determining the number $N_T$ of APs having broadcast signals with strength greater than or equal to a threshold value among the signals received from the plurality of APs, comparing the number $N_T$ of APs to the number $N_{T-1}$ of APs having broadcast signals with strength greater than or equal to the threshold value in a previous period, and determining a data transmission rate between the vehicle and the AP on the basis of a result of the comparison.

Also, the signal broadcast from the AP may include a parameter indicating at least one of unique identification information (SSID), a cell ID, a state, transmission power, and a supported transmission rate of the AP.

Also, the predetermined AP according to an embodiment of the present invention may be an AP having broadcast a signal with the greatest strength.

Also, the determining of a data transmission rate between the vehicle and the AP on the basis of a result of the comparison according to an embodiment of the present invention may include maintaining the data transmission rate between the vehicle and the AP at a current data transmission rate $R_{T-1}$ when the number $N_T$ of APs having broadcast signals with strength greater than or equal to the threshold value in a current period is equal to the number $N_{T-1}$ of APs having broadcast signals with strength greater than or equal to the threshold value in the previous period, decreasing the data transmission rate between the vehicle and the AP below $R_{T-1}$ when $N_{T-1}$ is less than $N_T$, and increasing the data transmission rate between the vehicle and the AP above $R_{T-1}$ when $N_{T-1}$ is greater than $N_T$.

The method according to an embodiment of the present invention may further include changing a modulation scheme in order to adjust the data transmission rate between the vehicle and the AP to the determined data transmission rate, and the change of the modulation scheme may include changing a modulation level from a high level to a low level in order to decrease the data transmission rate or changing a modulation level from a low level to a high level in order to increase the data transmission rate.

Also, in a communication environment using a fixed modulation scheme, the data transmission rate itself between the vehicle and the AP may be adjusted without the change of the modulation scheme. The adjustment of the data transmission rate itself between the vehicle and the AP may be to decrease or increase the data transmission rate.

Also, the data transmission rate between the vehicle and the AP may be adjustable by a transmission period of data in a buffer being changed, and the data transmission rate may be decreased by the transmission period of the data in the buffer being extended or may be increased by the transmission period of the data in the buffer being shortened.

Also, the method according to an embodiment of the present invention may further include adjusting the data transmission rate to increase by the first data transmission rate $R_0$ when the data transmission rate decreases to a minimum threshold value $R_{min}$.

Also, the method may further include maintaining the data transmission rate at a maximum threshold value $R_{max}$ when the data transmission rate increases to the maximum threshold value $R_{max}$.

An apparatus for adjusting a data transmission rate between a vehicle and an access point (AP) according to an embodiment of the present invention may include a communication unit configured to receive a signal broadcast from at least one AP near the vehicle and transmit and/or receive data to and/or from a predetermined AP at a first data transmission rate $R_0$ on the basis of the received signal, a storage unit configured to receive signals broadcast from a plurality of APs near the vehicle through the communication unit in every predetermined period while the vehicle is moving and to store the received signals, an analysis unit configured to determine the number $N_T$ of APs having broadcast signals with strength greater than or equal to a threshold value among the signals received from the plurality of APs and to compare the number $N_T$ of APs to the number $N_{T-1}$ of APs having broadcast signals with strength greater than or equal to the threshold value in a previous period, and a control unit configured to determine a data transmission rate between the vehicle and the AP on the basis of a result of the comparison.

Also, the signal broadcast from the AP may be a signal including a parameter indicating at least one of unique identification information (SSID), a cell ID, a state, transmission power, and a supported transmission rate of the AP.

Also, the predetermined AP according to an embodiment of the present invention may be an AP having broadcast a signal with the greatest strength.

The control unit according to an embodiment of the present invention may maintain the data transmission rate between the vehicle and the AP at a current data transmission rate $R_{T-1}$ when the number $N_T$ of APs having broadcast signals with strength greater than or equal to the threshold value in a current period is equal to the number $N_{T-1}$ of APs having broadcast signals with strength greater than or equal to the threshold value in the previous period, decrease the data transmission rate between the vehicle and the AP below $R_{T-1}$ when $N_{T-1}$ is less than $N_T$, and increase the data transmission rate between the vehicle and the AP above $R_{T-1}$ when $N_{T-1}$ is greater than $N_T$.

The apparatus according to an embodiment of the present invention may further include a changing unit configured to change a modulation scheme in order to adjust the data transmission rate between the vehicle and the AP to the determined data transmission rate. The change of the modulation scheme may include changing a modulation level from a high level to a low level in order to decrease the data transmission rate or changing a modulation level from a low level to a high level in order to increase the data transmission rate.

Also, in a communication environment using a fixed modulation scheme, the data transmission rate itself between the vehicle and the AP may be adjusted by the control unit without the change of the modulation scheme. The adjustment of the data transmission rate itself between the vehicle and the AP may be to decrease or increase the data transmission rate.

Also, the data transmission rate between the vehicle and the AP may be adjustable by a transmission period of data in a buffer connected with the communication unit being changed, and the data transmission rate may be decreased by the transmission period of the data in the buffer being extended or may be increased by the transmission period of the data in the buffer being shortened.

Also, the control unit may adjust the data transmission rate to increase by the first data transmission rate $R_0$ when the data transmission rate decreases to a minimum threshold value $R_{min}$.

Also, the control unit may maintain the data transmission rate at a maximum threshold value $R_{max}$ when the data transmission rate increases to the maximum threshold value $R_{max}$.

According to an embodiment of the present invention, there may be provided a computer-readable recording medium on which a computer program for executing the above-methods is recorded.

MODE OF THE INVENTION

Hereinafter, embodiments of the present invention will be described in detail to be easily embodied by those skilled in the art with reference to the accompanying drawings. The present invention may, however, be embodied in many different forms and should not be construed as being limited to the embodiments set forth herein. In the accompanying drawings, portions irrelevant to a description of the example embodiments will be omitted for clarity. Moreover, like reference numerals refer to like elements throughout.

The terms used herein will be briefly described, and the present invention will be described in detail.

The terms used herein have been selected as general terms which are widely used at present, in consideration of the functions of the present invention, and this may be altered according to the intent of an operator skilled in the art, conventional practice, or introduction of new technology. Also, if there is a term which is arbitrarily selected by the applicant in a specific case, in this case, a meaning of the term will be described in detail in a corresponding description portion of the exemplary embodiments. Therefore, the terms used herein should be defined on the basis of the overall content of the present invention instead of a simple name of each of the terms.

Furthermore, when one part is referred to as "comprising" (or including or having) other elements, it should be understood that it can comprise (or include or have) only those elements, or other elements as well as those elements unless specifically described otherwise. Moreover, each of terms such as "unit" and "module" described in the embodiments denotes an element for performing at least one function or operation, and may be implemented in hardware, software or a combination of hardware and software.

The present invention relates to a method and apparatus for variably controlling a data transmission rate in data communication between a vehicle and a base station, and more particularly, to a method and apparatus for variably determining a data transmission rate according to the number of APs near a vehicle in order to increase seamlessness and reliability of data communication. For example, a vehicle detects the number of communicably connectable APs from beacon signals that are received in every predetermined period while the vehicle is moving and decreases a data transmission rate when the number of connectable APs in the current period is greater than the number of connectable APs in the previous period and increases a data transmission rate when the number of connectable APs in the current period is less than the number of connectable APs in the previous period. When the data transmission rate decreases to a minimum threshold value, the data transmission rate may be returned to, for example, an initial data transmission rate or the like. When the data transmission rate increases to a maximum threshold value, the data transmission rate may be maintained at the maximum threshold value.

Hereinafter, the present invention will be described in detail with reference to the accompanying drawings.

Figure 2:
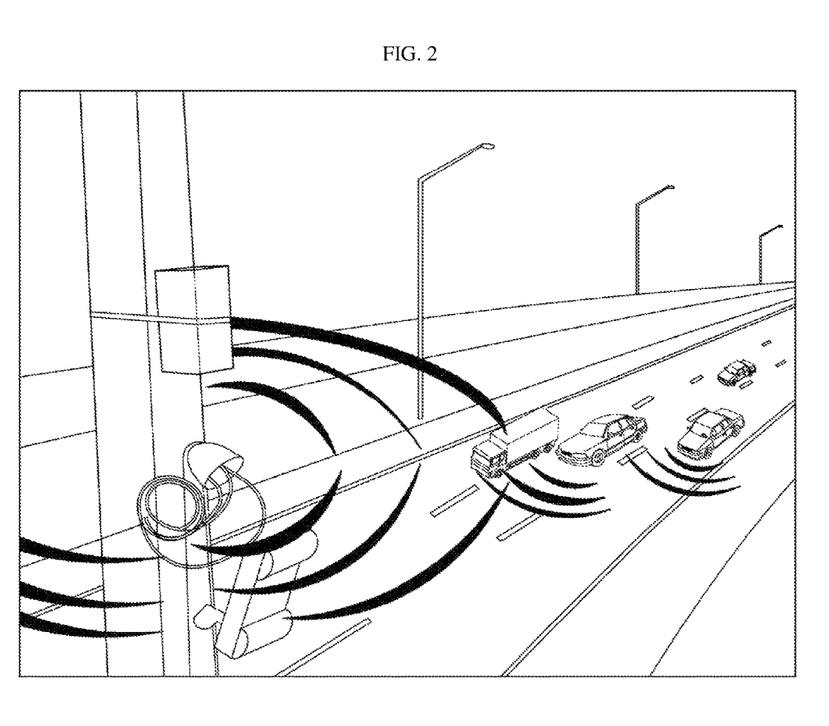
FIG. 2 is a diagram showing an example of V2I communication.

FIG. 2 is a diagram showing an example of V2I communication. Referring to FIG. 2, generally, the V2I communication may refer to communication between a vehicle and a nearby base station or wireless LAN AP by means of a communication module of the vehicle. The communication module may include a cellular communication module, a wireless LAN AP communication module such as Wi-Fi, etc. The AP may periodically broadcast a signal containing information regarding various types of parameter sets indicating an SSID, which is a unique identifier, a cell ID, a current state, transmission power, a supported transmission rate, etc. The signal may be a beacon signal. The communication module of the vehicle may receive a beacon signal broadcast by an external AP, detect a connectable AP through a signal intensity measurement method and a cell ID, and connect to the detected AP to communication with the AP.

Figure 3:
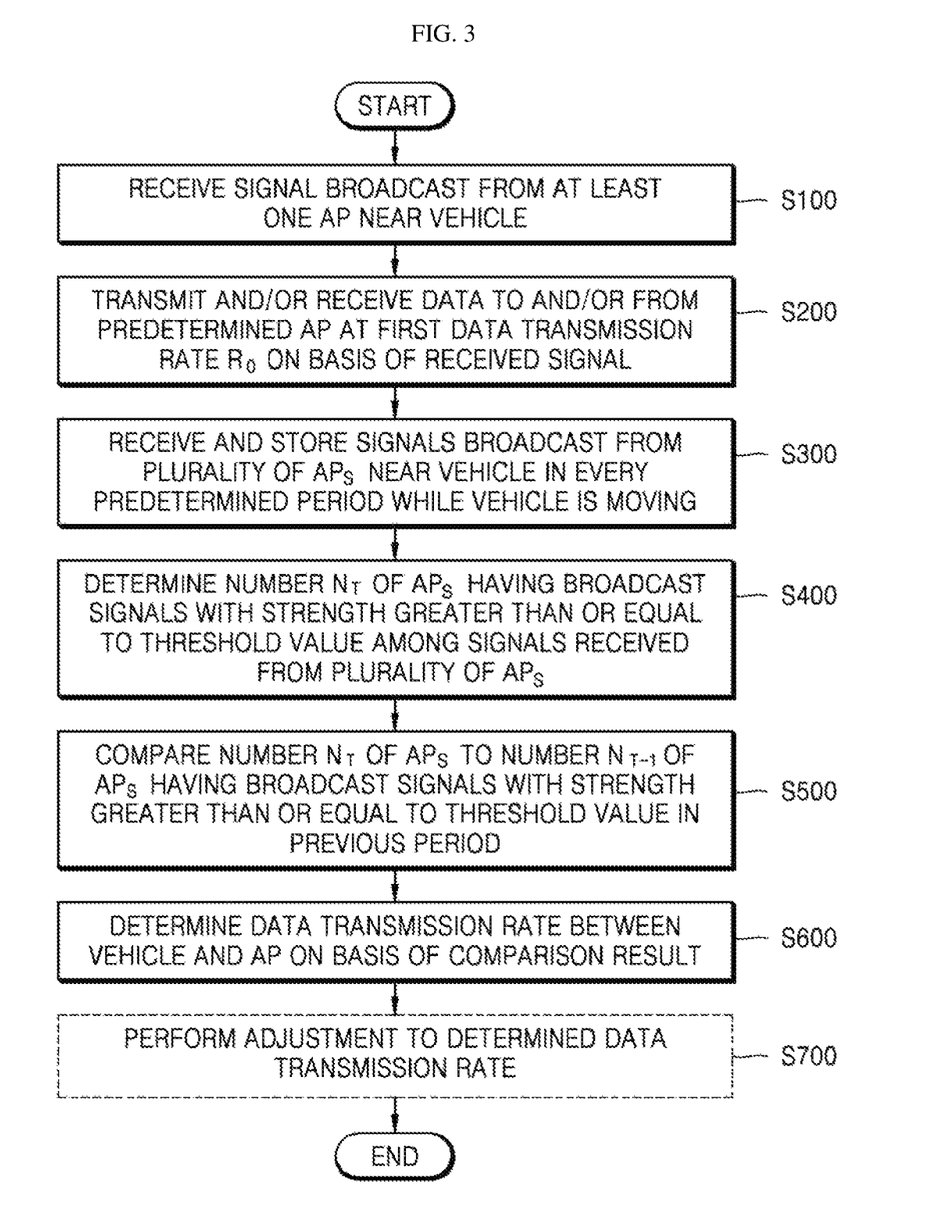
FIG. 3 is a flowchart illustrating a method of adjusting a data transmission rate between a vehicle and an AP according to an embodiment of the present invention.

FIG. 3 is a flowchart illustrating a method of adjusting a data transmission rate between a vehicle and an AP according to an embodiment of the present invention.

The method of adjusting a data transmission rate between a vehicle and an AP according to an embodiment of the present invention may include receiving a signal broadcast from at least one AP near the vehicle (S100), transmitting and/or receiving data to and/or from a predetermined AP at a first data transmission rate $R_0$ on the basis of the received signal (S200), receiving and storing signals broadcast from a plurality of APs near the vehicle in every predetermined period while the vehicle is moving (S300), determining the number $N_T$ of APs having broadcast signals with strength greater than or equal to a threshold value among the signals received from the plurality of APs (S400), comparing the number $N_T$ of APs to the number $N_{T-1}$ of APs having broadcast signals with strength greater than or equal to the threshold value in the previous period (S500), and determining a data transmission rate between the vehicle and the AP on the basis of a result of the comparison (S600).

Also, as described above, the signal broadcast from the AP may include parameters indicating at least one of unique identification information (SSID), a cell ID, a state, transmission power, and a supported transmission rate of the AP.

Also, the predetermined AP may be an AP having broadcast a signal with the greatest strength.

Also, according to an embodiment of the present, the determining of a data transmission rate between the vehicle and the AP on the basis of a result of the comparison (S600) may include maintaining the data transmission rate between the vehicle and the AP at the current data transmission rate $R_{T-1}$ when the number $N_T$ of APs having broadcast signals with strength greater than or equal to the threshold value in the current period is equal to the number $N_{T-1}$ of APs having broadcast signals with strength greater than or equal to the threshold value in the previous period, decreasing the data transmission rate between the vehicle and the AP below $R_{T-1}$ when $N_{T-1}$ is less than $N_T$, and increasing the data transmission rate between the vehicle and the AP above $R_{T-1}$ when $N_{T-1}$ is greater than $N_T$.

Also, the method according to an embodiment of the present invention may further comprising adjusting the data transmission rate between the vehicle and the AP on the basis of the data transmission rate determined in S600 (S700). According to an embodiment of the present invention, the adjusting of the data transmission rate (S700) may further include changing a modulation scheme in order to adjust the data transmission rate between the vehicle and the AP to the determined data transmission rate (S710). The change of the modulation scheme may include changing a modulation level from a high level to a low level in order to decrease the data transmission rate or changing a modulation level from a low level to a high level in order to increase the data transmission rate.

Also, in a communication environment using a fixed modulation scheme, the data transmission rate itself between the vehicle and the AP may be adjusted without the change of the modulation scheme. The adjustment of the data transmission rate itself between the vehicle and the AP may be to decrease or increase the data transmission rate.

Also, the adjusting of the data transmission rate (S700) may further include adjusting the data transmission rate between the vehicle and the AP by changing a transmission period of data in a buffer (S720). In other words, the data transmission rate between the vehicle and the AP is adjustable by the transmission period of the data in the buffer being changed, and may be decreased by the transmission period of the data in the buffer being extended or may be increased by the transmission period of the data in the buffer being shortened.

Also, according to an embodiment of the present invention, the adjusting of the data transmission rate (S700) may further include adjusting the data transmission rate by a first data transmission rate $R_0$ when the data transmission rate decreases to the minimum threshold value $R_{min}$ (S731).

Also, the adjusting of the data transmission rate (S700) may further include maintaining the data transmission at the maximum threshold value $R_{max}$ when the data transmission rate increases to the maximum threshold value $R_{max}$ (S732).

Figure 4:
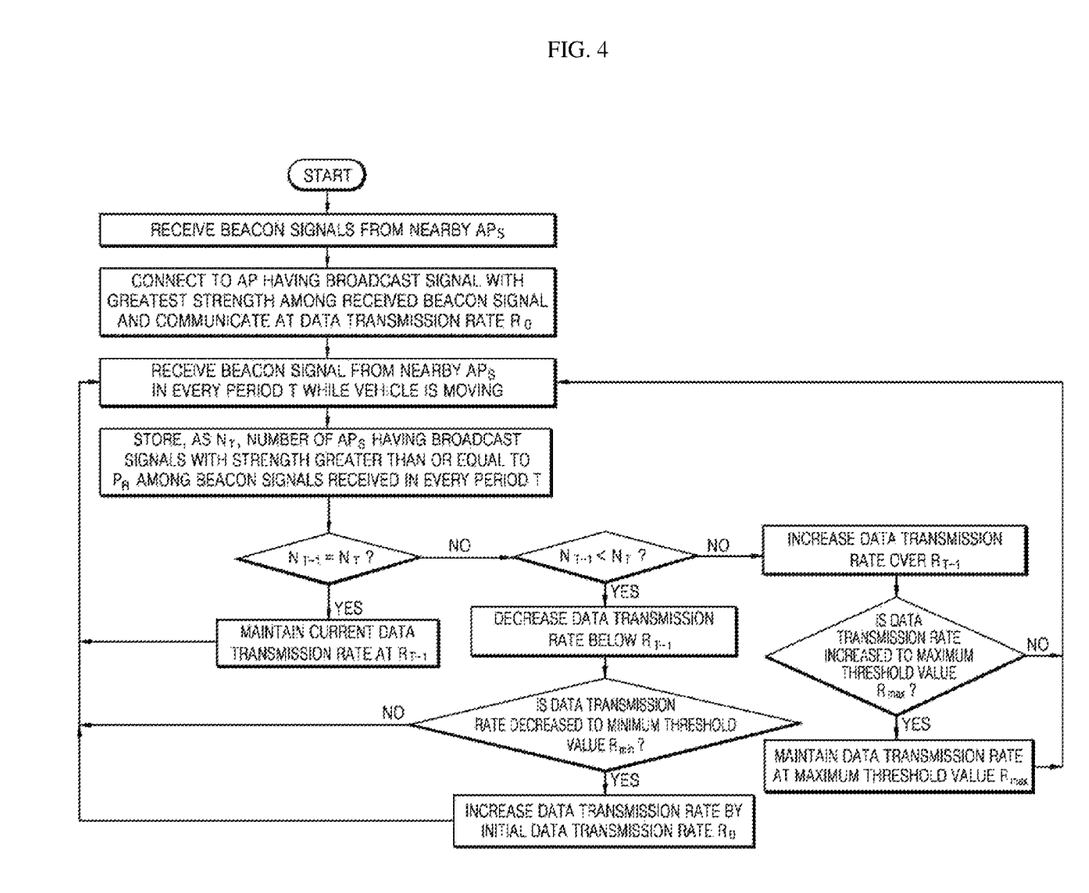
FIG. 4 is a flowchart showing an example of a process of adjusting a data transmission rate according to an embodiment of the present invention.

FIG. 4 is a flowchart showing an example of a process of adjusting a data transmission rate according to an embodiment of the present invention. The method of determining a data transmission rate according to the number of available APs near a vehicle according to an embodiment of the present invention will be described in detail below with reference to FIG. 4.

As shown in FIG. 4, when a vehicle is started, power is supplied to the communication unit 1100 to enable the communication unit 1100 to receive a beacon signal from at least one AP near the vehicle. Information regarding nearby APs received from the communication unit 1100 may be stored in the storage unit 1200. The analysis unit 1300 may perform comparison on the information regarding the APs stored in the storage unit 1200 and then determine an AP having broadcast a signal with the greatest strength. The control unit 1400 may perform connection with the AP determined by the analysis unit 1300 and start communication at a first data transmission rate $R_0$. The first data transmission rate may refer to an initial data transmission rate or the like. In this case, the communication unit 1100, such as a Wi-Fi module, maintains communication with the current AP and receives beacon signals from at least one nearby AP in every period T while the vehicle is traveling. The storage unit 1200 may store information regarding the received beacon signals in which various types of parameter sets such as an SSID, which is a unique identifier, a cell ID, a current state, transmission power, and a supported transmission rate are included. The analysis unit 1300 may determine the number $N_T$ of APs having broadcast signals with strength greater than or equal to $P_R$ through a signal strength measurement method and a cell ID by using the information regarding the beacon signals stored in the storage unit 1200. The number $N_T$ of APs having broadcast signals with strength greater than or equal to $P_R$ in the period T may be stored in the storage unit 1200.

The analysis unit 1300 may compare the number $N_T$ of APs having broadcast signals with strength greater than or equal to $P_R$ in the current period T to the number $N_{T-1}$ of APs having broadcast signals with strength greater than or equal to $P_R$ in the previous period T−1. The control unit 1400 may determine a data transmission rate on the basis of a result of the comparison.

The signal strength $P_R$ is set to −60 dBm and thus may be preset such that an AP having broadcast a signal with good strength is found.

When the result of the comparison of the analysis unit 1300 is that $N_{T-1}$ is equal to $N_T$, the control unit 1400 may maintain the data transmission rate at $R_{T-1}$, which is the current data transmission rate. This is because when the number of connectable APs determined in the current period T is equal to the number of connectable APs determined in the previous period T−1, there is no change in surrounding environments for communication connection, and thus there is no need to change the data transmission rate.

When the result of the comparison of the analysis unit 1300 is that $N_{T-1}$ is less than $N_T$, the control unit 1400 may decrease the data transmission rate below $R_{T-1}$. This is because when the number of nearby connectable APs determined in the current period T is greater than that determined in the previous period T−1, it is possible to easily maintain the connection through a handoff to at least another nearby AP although the vehicle is disconnected from the current AP. Accordingly, it is possible to minimize damage to data frames by transmitting the vehicle information stored in the buffer 1600 at a low data transmission rate and thus continue to transmit data with high reliability.

When the result of the comparison of the analysis unit 1300 is that $N_{T-1}$ is greater than $N_T$, the control unit 1400 may increase the data transmission rate above $R_{T-1}$. When the number of nearby connectable APs determined in the current period T is less than that determined in the previous period T−1, it is impossible to easily maintain the connection through a handoff to at least another nearby AP when the vehicle is disconnected from the current AP. Accordingly, it is possible to continue to transmit a change in the vehicle information over time without loss thereof by transmitting the vehicle information stored in the buffer 1600 at a high data transmission rate while the vehicle is connected to the current AP, that is, before the vehicle connects to a subsequent AP.

The following three methods or the like may be considered as a method of the control unit 1400 changing the data transmission rate according to an embodiment of the present invention. First, a method of changing a modulation scheme may be considered. In this case, the modulation scheme may be changed from a low level modulation scheme to a high level modulation scheme when the data transmission rate is increased and may be changed from a high level modulation scheme to a low level modulation scheme when the data transmission rate is decreased. Second, a method of changing the data transmission rate by a Wi-Fi module itself in a stationary environment in which the modulation scheme cannot be changed may be considered. Third, a method of changing a transmission period for data accumulated in the buffer 1600 may be considered. Information acquired from the OBD is continuously accumulated in the buffer 1600. Accordingly, the data transmission rate may be changed by the transmission period of the data stored in the buffer 1600 being changed. When there are a large number of nearby connectable APs, a smaller amount of data may be transmitted during the same amount of time by the transmission period of the data accumulated in the buffer 1600 being lengthened. Thus, the data transmission rate may be decreased. When there are a small number of nearby connectable APs, a larger amount of data may be transmitted during the same amount of time by the transmission period of the data accumulated in the buffer 1600 being shortened. Thus, the data transmission rate may be increased.

The vehicle repeats the above process while traveling. At this point, when the data transmission rate decreases to the minimum threshold value $R_{min}$, the control unit 1400 may increase the data transmission rate by the first data transmission rate $R_0$. There is no problem when a large number of nearby connectable APs are still distributed near the vehicle. However, when the number of nearby APs suddenly decreases, a condition that the vehicle information stored in the buffer 1600 should be quickly transmitted is not satisfied, and thus reliability and seamlessness may be reduced.

When the data transmission rate increases to the maximum threshold value $R_{max}$, the control unit 1400 may maintain the data transmission rate at the maximum threshold value $R_{max}$. When a small number of nearby connectable APs are still distributed, the control unit 1400 should maintain the data transmission rate at the maximum threshold value $R_{max}$ for the purpose of transmission with high seamlessness and reliability.

The above process may be repeated until the vehicle is stopped.

Figure 5:
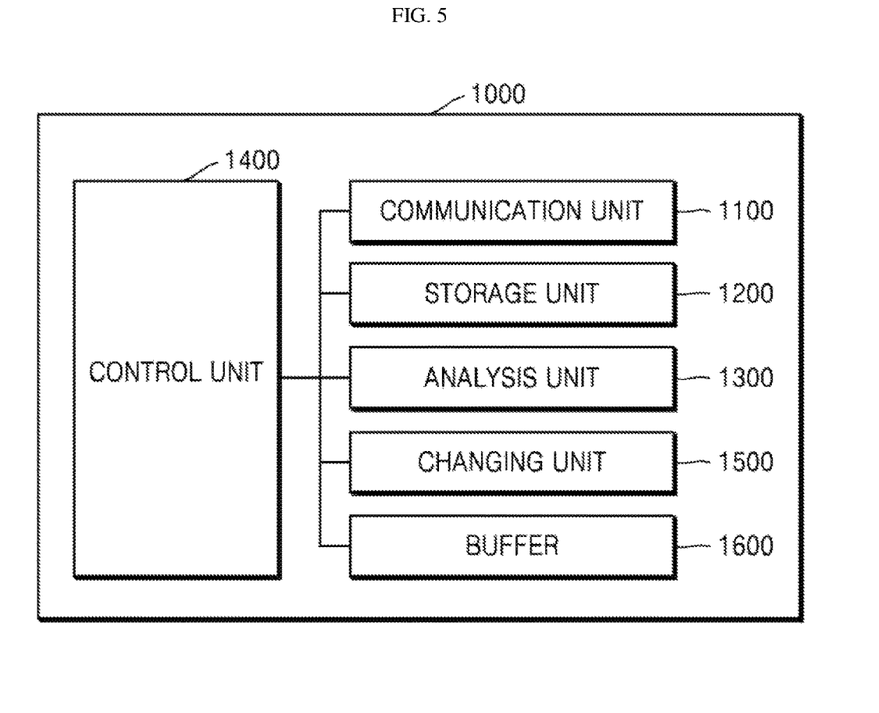
FIG. 5 is a block diagram showing an apparatus for adjusting a data transmission rate between a vehicle and an AP according to an embodiment of the present invention.

FIG. 5 is a block diagram showing an apparatus for adjusting a data transmission rate between a vehicle and an AP according to an embodiment of the present invention.

An apparatus for adjusting a data transmission rate between a vehicle and an AP according to an embodiment of the present invention may include a communication unit 1100, a storage unit 1200, an analysis unit 1300, a control unit 1400, a changing unit 1500, a buffer 1600, and the like. In other words, an apparatus 1000 for adjusting a data transmission rate between a vehicle and an AP according to an embodiment of the present invention may include a communication unit 1100 configured to receive a signal broadcast from at least one AP near the vehicle and transmitting and/or receiving data to and/or from a predetermined AP at a first data transmission rate $R_0$ on the basis of the received signal, a storage unit 1200 configured to receive signals broadcast from a plurality of APs near the vehicle through the communication unit 1100 in every predetermined period while the vehicle is moving and to store the received signals, an analysis unit 1300 configured to determine the number $N_T$ of APs having broadcast signals with strength greater than or equal to a threshold value among the signals received from the plurality of APs and compare the number $N_T$ of APs to the number $N_{T-1}$ of APs having broadcast signals with strength greater than or equal to the threshold value among signals received in the previous period, and a control unit 1400 configured to determine a data transmission rate between the vehicle and the AP on the basis of a result of the comparison.

The communication unit 1100 may be a Wi-Fi module or the like of the vehicle. The communication unit 1100 may receive a beacon signal from at least one AP near the vehicle in every period T. The signal broadcast from the AP may be a signal including a parameter indicating at least one of unique identification information (SSID), a cell ID, a state, transmission power, and a supported transmission rate of the AP. In other words, the storage unit 1200 may store the beacons signal including various types of parameter sets such as an SSID, a cell ID, a current state, transmission power, a supported transmission rate, or the like of the AP, which are received through the communication unit 1100.

Also, the predetermined AP may be an AP having broadcast a signal with the greatest strength. The analysis unit 1300 may determine the number of APs having broadcast signals with strength greater than or equal to $P_R$ on the basis of a signal strength measurement method and a cell ID by using information regarding the beacon signals stored in the storage unit 1200. For example, $P_R$ is set to −60 dBm and thus an AP having broadcast a signal with the greatest strength may be founded from among the plurality of APs on the basis of the set $P_R$. The control unit 1400 may determine the data transmission rate according to the number of APs determined by the analysis unit 1300.

According to an embodiment of the present, the control unit 1400 may maintain the data transmission rate between the vehicle and the AP at the current data transmission rate $R_{T-1}$ when the number $N_T$ of APs having broadcast signals with strength greater than or equal to the threshold value in the current period is equal to the number $N_{T-1}$ of APs having broadcast signals with strength greater than or equal to the threshold value in the previous period, decrease the data transmission rate between the vehicle and the AP below $R_{T-1}$ when $N_{T-1}$ is less than $N_T$, and increase the data transmission rate between the vehicle and the AP above $R_{T-1}$ when $N_{T-1}$ is greater than $N_T$.

Also, the apparatus 1000 according to an embodiment of the present invention may further include a changing unit 1500 configured to change a modulation scheme in order to adjust the data transmission rate between the vehicle and the AP to the determined data transmission rate. The change of the modulation scheme may include changing a modulation level from a high level to a low level in order to decrease the data transmission rate or changing a modulation level from a low level to a high level in order to increase the data transmission rate.

Also, in a communication environment using a fixed modulation scheme, the data transmission rate itself between the vehicle and the AP may be adjusted by the control unit 1400 without the change of the modulation scheme. The adjustment of the data transmission rate itself between the vehicle and the AP may be to decrease or increase the data transmission rate.

Also, the data transmission rate between the vehicle and the AP is adjustable by a transmission period of data in the buffer 1600 connected with the communication unit 1100 being changed. The control unit 1400 may decrease the data transmission rate by extending the transmission period of the data in the buffer 1600 or may increase the data transmission rate by shortening the transmission period of the data in the buffer 1600.

Also, when the data transmission rate decreases to the minimum threshold value $R_{min}$, the control unit 1400 may adjust the data transmission rate to increase by the first data transmission rate $R_0$.

Also, when the data transmission rate increases to the maximum threshold value $R_{max}$, the control unit 1400 may maintain the data transmission rate at the maximum threshold value $R_{max}$.

The above-described method may be applied to the apparatus according to an embodiment of the present invention. Accordingly, repetitive description on the above-described method will be omitted.

An embodiment of the present invention may be implemented as a recording medium including computer-executable instructions such as computer-executable program module. A computer-readable medium may be any usable medium accessible by a computer and may include volatile and non-volatile media and discrete and integrated media. Also, the computer-readable medium may include both a computer storage medium and a communication medium. The computer storage medium includes the volatile and non-volatile media and the discrete and integrated media, which are implemented in any method or technique for storing information such as a computer readable instruction, data structure, program module, or other data. The communication module typically includes the computer readable instruction, data structure, program module, or other data and transmission mechanism of a modulated data signal such as a carrier and further includes any information transmission medium.

The above description is merely illustrative, and it will be understood by those skilled in the art that various changes in form and details may be made therein without departing from the spirit and scope of the invention as defined by the appended claims. The above embodiments are accordingly to be regarded as illustrative rather than restrictive. For example, while a single element may be distributed and then carried out, distributed elements may be carried out in a combination thereof.

Therefore, the scope of the present invention is defined not by the detailed description but by the appended claims, and all changes or modifications within the appended claims and their equivalents will be construed as being included in the scope of the invention.

The invention claimed is:

1. A method of adjusting a data transmission rate between a vehicle and an access point (AP), the method comprising:
    receiving a signal broadcast from at least one AP near the vehicle;
    transmitting and/or receiving data to and/or from a predetermined AP at a first data transmission rate $R_0$ on the basis of the received signal;
    receiving and storing signals broadcast from a plurality of APs near the vehicle in every predetermined period while the vehicle is moving;
    determining a number $N_T$ of APs having broadcast signals with strength greater than or equal to a threshold value among the signals received from the plurality of APs;
    comparing the number $N_T$ of APs to a number $N_{T-1}$ of APs having broadcast signals with strength greater than or equal to the threshold value in a previous period;
    determining a data transmission rate between the vehicle and the AP on the basis of a result of the comparison, and
    adjusting the data transmission rate between the vehicle and the AP on the basis of the determined data transmission rate.

2. The method of claim 1, wherein the signal broadcast from the AP includes a parameter indicating at least one of unique identification information (SSID), a cell ID, a state, transmission power, and a supported transmission rate of the AP.

3. The method of claim 1, wherein the predetermined AP is an AP having broadcast a signal with the greatest strength.

4. The method of claim 1, wherein the determining of a data transmission rate between the vehicle and the AP on the basis of a result of the comparison comprises:
    maintaining the data transmission rate between the vehicle and the AP at a current data transmission rate $R_{T-1}$ when the number $N_T$ of APs having broadcast signals with strength greater than or equal to the threshold value in a current period is equal to the number $N_{T-1}$ of APs having broadcast signals with strength greater than or equal to the threshold value in the previous period;
    decreasing the data transmission rate between the vehicle and the AP below $R_{T-1}$ when $N_{T-1}$ is less than $N_T$; and
    increasing the data transmission rate between the vehicle and the AP above $R_{T-1}$ when $N_{T-1}$ is greater than $N_T$.

5. The method of claim 1, further comprising changing a modulation scheme in order to adjust the data transmission rate between the vehicle and the AP to the determined data transmission rate, wherein
    the change of the modulation scheme includes changing a modulation level from a high level to a low level in order to decrease the data transmission rate or changing a modulation level from a low level to a high level in order to increase the data transmission rate.

6. The method of claim 1, wherein in a communication environment using a fixed modulation scheme, the data transmission rate itself between the vehicle and the AP is adjusted without the change of the modulation scheme.

7. The method of claim 6, wherein the adjustment of the data transmission rate itself between the vehicle and the AP is to decrease or increase the data transmission rate.

8. The method of claim 1, wherein:
    the data transmission rate between the vehicle and the AP is adjustable by a transmission period of data in a buffer being changed; and
    the data transmission rate is decreased by the transmission period of the data in the buffer being extended or is increased by the transmission period of the data in the buffer being shortened.

9. The method of claim 4, further comprising adjusting the data transmission rate to increase by the first data transmission rate $R_0$ when the data transmission rate decreases to a minimum threshold value $R_{min}$.

10. The method of claim 4, further comprising maintaining the data transmission rate at a maximum threshold value $R_{max}$ when the data transmission rate increases to the maximum threshold value $R_{max}$.

11. An apparatus for adjusting a data transmission rate between a vehicle and an access point (AP), the apparatus comprising:
    a communication unit configured to receive a signal broadcast from at least one AP near the vehicle and transmit and/or receive data to and/or from a predetermined AP at a first data transmission rate $R_0$ on the basis of the received signal;
    a storage unit configured to receive signals broadcast from a plurality of APs near the vehicle through the communication unit in every predetermined period while the vehicle is moving and to store the received signals;
    an analysis unit configured to determine a number $N_T$ of APs having broadcast signals with strength greater than or equal to a threshold value among the signals received from the plurality of APs and to compare the number $N_T$ of APs to a number $N_{T-1}$ of APs having broadcast signals with strength greater than or equal to the threshold value in a previous period;
    a control unit configured to determine a data transmission rate between the vehicle and the AP on the basis of a result of the comparison, and
    a changing unit configured to adjust the data transmission rate between the vehicle and the AP on the basis of the determined data transmission rate.

12. The apparatus of claim 11, wherein the signal broadcast from the AP is a signal including a parameter indicating at least one of unique identification information (SSID), a cell ID, a state, transmission power, and a supported transmission rate of the AP.

13. The apparatus of claim 11, wherein the predetermined AP is an AP having broadcast a signal with the greatest strength.

14. The apparatus of claim 11, wherein:
    the control unit maintains the data transmission rate between the vehicle and the AP at a current data transmission rate $R_{T-1}$ when the number $N_T$ of APs having broadcast signals with strength greater than or equal to the threshold value in a current period is equal to the number $N_{T-1}$ of APs having broadcast signals with strength greater than or equal to the threshold value in the previous period;
    the control unit decreases the data transmission rate between the vehicle and the AP below $R_{T-1}$ when $N_{T-1}$ is less than $N_T$; and the control unit increases the data transmission rate between the vehicle and the AP above $R_{T-1}$ when $N_{T-1}$ is greater than $N_T$.

15. The apparatus of claim 11, wherein the changing unit configured to change a modulation scheme in order to adjust the data transmission rate between the vehicle and the AP to the determined data transmission rate, wherein the change of the modulation scheme includes changing a modulation level from a high level to a low level in order to decrease the data transmission rate or changing a modulation level from a low level to a high level in order to increase the data transmission rate.

16. The apparatus of claim 11, wherein in a communication environment using a fixed modulation scheme, the data transmission rate itself between the vehicle and the AP is adjusted by the control unit without the change of the modulation scheme.

17. The apparatus of claim 16, wherein the adjustment of the data transmission rate itself between the vehicle and the AP is to decrease or increase the data transmission rate.

18. The apparatus of claim 11, wherein:

the data transmission rate between the vehicle and the AP is adjustable by a transmission period of data in a buffer connected with the communication unit being changed; and the data transmission rate is decreased by the transmission period of the data in the buffer being extended or is increased by the transmission period of the data in the buffer being shortened.

19. The apparatus of claim 14, wherein the control unit adjusts the data transmission rate to increase by the first data transmission rate $R_0$ when the data transmission rate decreases to a minimum threshold value $R_{min}$.

20. The apparatus of claim 14, wherein the control unit maintains the data transmission rate at a maximum threshold value $R_{max}$ when the data transmission rate increases to the maximum threshold value $R_{max}$.

* * * * *